UNITED STATES PATENT OFFICE.

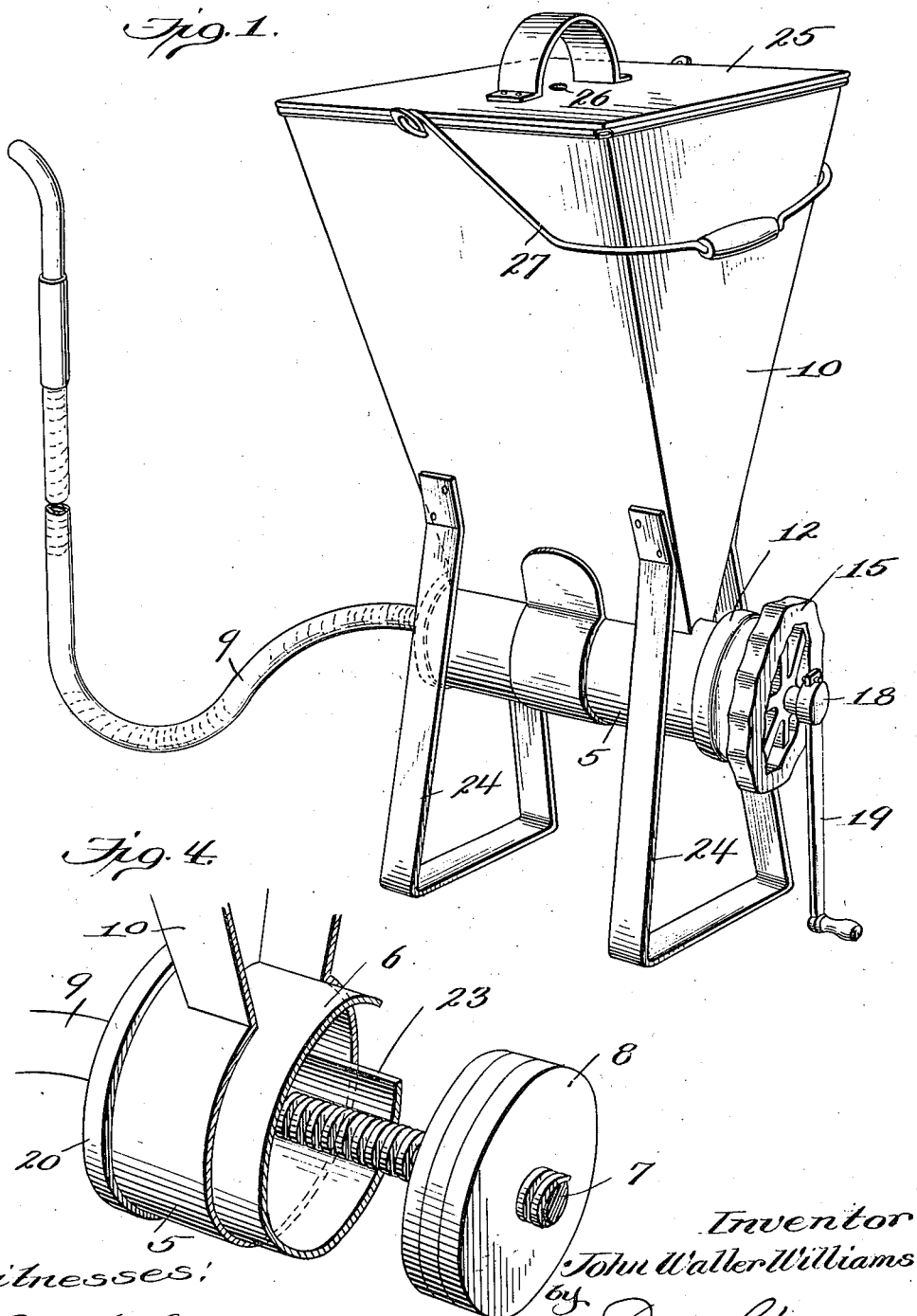

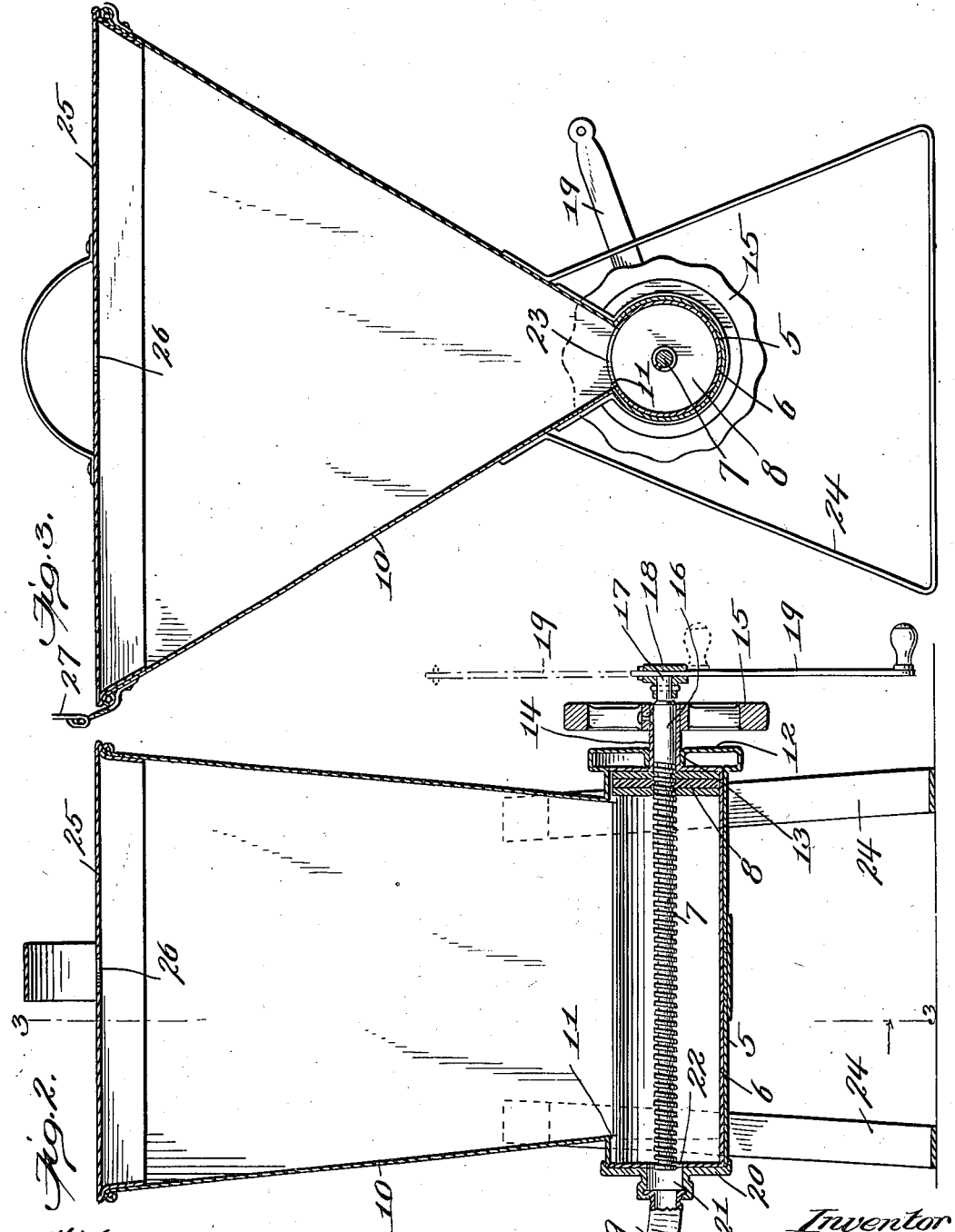

JOHN WALLER WILLIAMS, OF SALISBURY, MARYLAND.

GRAVITY-FILLING OIL OR GREASE GUN.

1,211,264.  Specification of Letters Patent.  Patented Jan. 2, 1917.

Application filed April 29, 1916. Serial No. 94,456.

*To all whom it may concern:*

Be it known that I, JOHN WALLER WILLIAMS, a citizen of the United States, residing at Salisbury, in the county of Wicomico and State of Maryland, have invented new and useful Improvements in Gravity-Filling Oil or Grease Guns, of which the following is a specification.

This invention relates to oil or grease guns for injecting a lubricant into various lubricating devices or parts requiring the application thereto of a lubricant, and particularly adapted for use in connection with automobiles or other vehicles.

The main object of the invention is to provide an oil or grease gun which is filled alone by gravity and not by suction or force as in devices of this character now commonly known.

A further object of the invention is to provide an oil or grease gun which may be filled without requiring the operator to bring his hands in contact with the oil or lubricant and thereby insure a comparatively cleanly operation as well as a more effective result in expeditiously charging the gun with the lubricant and facilitating the injection of the latter into the part desired to be lubricated.

With these and other objects and advantages in view the invention consists in the preferred construction and arrangement of parts which will be more fully hereinafter described and claimed.

In the drawings: Figure 1 is a perspective view of an oil or grease gun embodying the features of the invention. Fig. 2 is a longitudinal vertical section of the improved grease gun. Fig. 3 is a transverse vertical section on the line 3—3, Fig. 2. Fig. 4 is a sectional perspective view of portions of the improved grease gun and particularly illustrating a part of the cylinder, manually rotatable cut-off for the cylinder, and the follower or plunger and a part of the screw feed therefor.

The improved oil or grease gun comprises essentially a horizontally disposed shell or cylindrical casing 5 which serves as a nozzle, a manually rotatable cylindrical cutoff valve or shell 6 snugly fitted within the casing 5, a feed screw 7 extending centrally through the cylindrical cutoff valve 6 and casing 5, a follower or plunger 8 on the screw and movable longitudinally within the cylindrical cutoff valve 6, an outlet pipe or tube 9 connected to the center of the one end of the casing 5, and a hopper 10 secured to the upper portion of the casing 5 and serving to supply the latter with the oil or grease or other lubricating material adapted to be injected or used in connection with the improved gun. The cylindrical casing 5 constituting the nozzle of the improved gun is formed with a top opening 11, and the lower end of the hopper 10 registers with this opening, there being no obstructing devices between the lower end of the hopper 10 and the casing or nozzle 5, and the lower end of the hopper 10 has a clear or unobstructed opening into the casing or nozzle 5. The casing or nozzle 5 is shaped at one extremity to form an end closure 12 and provided, as at 13, with a center bearing in which a tubular extension 14 of the cylindrical cut-off valve 6 is rotatably mounted, the said extension snugly fitting in the bearing 13 and having a hand-wheel 15 firmly secured to the outer end thereof. The extension 14 also serves as a bearing for the outer unthreaded stem 16 of the feed screw 7, the terminal 17 of the said stem being reduced and having a slotted turn-head 18 secured thereto and provided with a slip crank-handle 19 which is free to move through the head, as indicated by dotted lines in Fig. 2. The opposite end of the casing or nozzle 5 is closed by a cap 20 having a central tubular outlet 21 registering with an outlet opening 22 in the center of the adjacent end of the casing or nozzle 5, the tube or pipe 9 being secured to the outer terminal of the tube or outlet 21, as shown by Fig. 2. The end of the feed screw 7 projects into the outlet opening 22 of the casing or nozzle 5 and is sustained in such position in view of the fact that the opposite end has a stable bearing in the tubular extension 14, the latter being long enough to maintain the feed screw 7 in central position within the cylindrical valve 6 and casing or nozzle 5. Moreover, the feed screw 7 will be held in its desired relative position within the cylindrical valve 6 by the follower or plunger 8 which snugly engages the inner surface of the said cylindrical valve. The opening 11 in the top of the casing or nozzle 5 is of less length than the latter so that sufficient length of the said casing or nozzle is provided at opposite extremities to permit the follower or plunger 8 when in its two extreme adjustments to be clear of the opening 11. The cylindrical valve 6 is formed with an opening or slot 23 extending longitudinally thereof and of the same width as the opening 11 in the top of the casing or nozzle 5 so that when the cylindrical valve 6 is manually turned through the operation of the hand-wheel 15 its opening 23 may be brought into accurate registration with the opening 11 and thus clear the bottom outlet of the hopper 10.

As a matter of convenience the hopper is provided with supports or legs 24 to give the same a stable position upon the ground surface or other resting means when the device is in use. The hopper 10 also has a protective cover or lid 25 formed with a central air vent 26, and as a convenient means of transporting the entire device from one place to another a bail or handle 27 is attached thereto, as shown particularly by Fig. 1. The tube or pipe 9 is of the usual form employed in connection with oil or grease guns and may be of any suitable length.

In operation the hopper 10 is charged with oil or grease in semifluid condition, the cylindrical valve 6 first having been rotated to shut off communication between the interior thereof and the bottom or outlet end of the hopper through a proper manipulation of the hand wheel 15. The valve 6 will remain in closed position until it is desired to permit the oil or grease from the hopper to pass into the valve. Prior to charging the interior of the valve 6 and the casing or nozzle 5 the follower 8 is caused to move rearwardly by rotating the feed screw 7 in a proper direction through the medium of the slip crank-handle 19, the said follower being in a starting position as shown by Fig. 2. To charge the interior of the valve 6 and the casing or nozzle 5 the said valve is rotated within the casing by operating the hand-wheel 15 until the opening 23 registers with the opening 11 and the oil or grease in the hopper 10 will then gravitate into the interior of the valve; and when the latter has become properly filled or charged the valve is again turned to close off the bottom of the hopper, and to inject the lubricant from the valve the feed screw 7 is operated through the medium of the crank-handle 19 and the follower 8 is thereby fed forwardly and forces the oil or grease within the valve through the outlet opening 22 and outlet tube 21 into the pipe or tube 9, and the parts are so proportioned that the follower 8 may be fed forwardly fully to the end of the casing or nozzle 5 having the outlet 22 therein, as shown by dotted lines in Fig. 2, and thus completely force out all of the oil or lubricant within the valve 6.

From the foregoing simple operation it will be seen that oil or lubricant may be conveniently injected into a bearing or other part with facility and that the cylindrical valve 6 and casing or nozzle 5 are automatically charged with the oil or lubricant from the hopper solely by the action of gravity and that no force or suction is employed, nor is the operator required to bring his hands in contact with the oil or grease during the charging operation. The hopper is of sufficient dimensions to carry quite a large charge and the complete device will always be ready for use without requiring frequent charging of the same.

It will be understood that changes in the proportions, dimensions and minor details may be adopted as desired.

What is claimed is:

1. An oil or grease gun having a receiving nozzle with an outlet at one end and an injecting tube communicating therewith, a charging means for the nozzle, a cut-off rotatably mounted in and extending approximately full length of the interior of the nozzle to control communication of the nozzle with the charging means, said cut-off having an inlet along the side portion and an outlet at one end in communication with the outlet of the nozzle, the cut-off being automatically supplied with oil or grease from the charging means, and expelling means longitudinally movable in the nozzle and the cut-off for discharging the contents longitudinally of the nozzle through the injecting tube.

2. An oil or grease gun having a fixed receiving nozzle with an outlet at one end and an injecting tube connected to the outlet end, a charging means for the nozzle, a tubular cut-off with an end outlet and side inlet and snugly fitting and rotatably disposed in the nozzle to control communication of the nozzle and the cut-off with the charging means, the said cut-off extending approximately full length of the interior of the nozzle to receive oil or grease automatically from the charging means while located in the said nozzle, and a follower longitudinally movable in the cut-off for discharging the contents of the nozzle through the end outlet of the nozzle and into and through the tube, the cut-off being rotatable independently of the follower, the end outlet of the cut-off at all times registering with the end outlet of the nozzle.

3. An oil or grease gun having a nozzle with an end outlet, a charging means for the nozzle, a rotatable tubular cut-off in the nozzle to control communication of the nozzle with the charging means and providing a lining extending approximately full length of the interior of the nozzle to automatically receive the oil or grease from the charging means, and means movably mounted in the cut-off and operable independently of the rotation of the said cut-off for discharging the contents of the nozzle and cut-off longitudinally of the latter through the end outlet means, the cut-off having an end outlet in continual communication with the end outlet of the nozzle and a side inlet to extend full length of the bottom portion of the charging means, the discharge of the contents of the nozzle and cut-off being effected when the side inlet of the cut-off is closed.

4. An oil or grease gun having a nozzle with an end outlet, a charging means having an outlet for feeding the nozzle by gravity, the outlet of the charging means extending full length of the bottom of the latter, a manually rotatable tubular cut-off in the nozzle to control communication of the nozzle with the charging means and having an inlet corresponding in dimensions to the outlet of the charging means to permit the oil or grease to have unrestricted automatic deposit in the cut-off, and means longitudinally movable in the cut-off and operable independently of the latter for discharging the contents of the said cut-off through the outlet of the latter, the tubular cut-off having an inlet in the side portion thereof of the same length and width as the outlet of the charging means, the discharge of the contents of the nozzle and cut-off being effected when the side inlet of the cut-off is closed.

5. In an oil or grease gun of the character specified, a nozzle provided with an intermediate inlet and an outlet at one end, a rotatable cut-off within the nozzle also having a side inlet corresponding in dimensions to and for registration with the inlet of the nozzle, a charging receptacle having an outlet in communication with the inlet of the nozzle, the cut-off also having an end outlet in constant registration with the end outlet of the nozzle and the inlets of the nozzle and cut-off permitting a free gravitation of the contents of the receptacle into the nozzle and cut-off, means movable in the cut-off for forcing the oil or grease through the end outlets of the cut-off and nozzle when the side inlet of the cut-off is closed, and means for independently operating the cut-off and the said movable means, the said movable means being longitudinally shiftable throughout the full length of the movable cut-off and the latter adjustable without affecting the said movable means.

6. In an oil or grease gun of the character specified, a charging receptacle of hopperlike form with a longitudinally extending outlet at the reduced bottom thereof, a nozzle fixed to the reduced bottom of the charging receptacle and provided with a side inlet of the same dimensions as the outlet of the said receptacle and also with an end outlet, a tubular cylindrical cut-off snugly fitting and rotatable within the nozzle and extending full length of the latter and also having a side inlet of the same dimensions as the inlet of the nozzle and outlet of the charging receptacle, the cut-off also being provided with an end outlet in constant registration with the outlet of the nozzle, the contents of the receptacle having a gravitating feed into the cut-off and the latter manually operable to close the outlet of the charging receptacle, a plunger snugly fitting within the cut-off and nozzle and having means to move the same fully from one end of the nozzle to the opposite end to force the contents of the nozzle and cut-off through the end outlets of the latter when the side inlet of the cut-off is closed, the plunger when in the extreme starting position thereof being clear of the outlet of the charging receptacle, and means for independently operating the cut-off and plunger.

In testimony whereof I have hereunto set my hand in presence of two subscribing witnesses.

JOHN WALLER WILLIAMS.

Witnesses:
C. C. OIELE,
JOHN W. KING.